United States Patent [19]

Oshima et al.

[11] Patent Number: 5,376,599
[45] Date of Patent: Dec. 27, 1994

[54] CARBON FIBER REINFORCED SILICON NITRIDE BASED NANOCOMPOSITE MATERIAL AND METHOD FOR PREPARING SAME

[75] Inventors: Kenji Oshima; Tsugio Ito; Yoshitsugu Kato, all of Aichi; Koichi Niihara, 9-7-1142, Kourigaoka, Hirakata, Osaka; Atsushi Nakahira, Osaka; Misao Iwata, Aichi, all of Japan

[73] Assignees: Noritake Co., Limited, Aichi; Koichi Niihara, Osaka, Japan

[21] Appl. No.: 960,104

[22] Filed: Oct. 13, 1992

[30] Foreign Application Priority Data

Oct. 11, 1991 [JP] Japan .................. 3-290388

[51] Int. Cl.⁵ .......................... C04B 35/52
[52] U.S. Cl. ...................... 501/90; 501/92; 501/95; 501/97; 501/98; 501/99; 501/100
[58] Field of Search ............ 501/95, 97, 98, 90, 501/92, 99, 100; C04B 35/52

[56] References Cited

U.S. PATENT DOCUMENTS 5,024,979 6/1991 Debaig-Valade et al. ........... 501/95

FOREIGN PATENT DOCUMENTS

| | | |
|---|---|---|
| 2004406 | 6/1990 | Canada . |
| 0337832A1 | 10/1989 | European Pat. Off. . |
| 0372381A2 | 6/1990 | European Pat. Off. . |
| 0400788A1 | 12/1990 | European Pat. Off. . |
| 3220559A1 | 12/1982 | Germany . |
| 3203659A1 | 8/1983 | Germany . |
| 47-34510 | 11/1972 | Japan . |
| 50-136306 | 10/1975 | Japan . |
| 57-34080 | 2/1982 | Japan . |
| 58-32071 | 2/1983 | Japan . |
| 0137366 | 8/1984 | Japan .................. 501/95 |
| 59-174575 | 10/1984 | Japan . |
| 0042278 | 3/1985 | Japan .................. 501/95 |
| 60-145903 | 8/1985 | Japan . |
| 60-226890 | 11/1985 | Japan . |
| 60-235765 | 11/1985 | Japan . |
| 61-89230 | 5/1986 | Japan . |
| 61-247663 | 11/1986 | Japan . |
| 62-35996 | 2/1987 | Japan . |
| 62-119174 | 5/1987 | Japan . |
| 62-119175 | 5/1987 | Japan . |
| 62-156135 | 7/1987 | Japan . |
| 2-26876 | 1/1990 | Japan . |
| 2100711A | 1/1983 | United Kingdom . |

OTHER PUBLICATIONS

English translation of Japanese Patent Publ. No. 59-137366 (Aug., 1984).

*Primary Examiner*—Karl Group
*Assistant Examiner*—Paul Marcantoni
*Attorney, Agent, or Firm*—Fish & Richardson

[57] ABSTRACT

Carbon fiber reinforced silicon nitride based nanocomposite material is produced by mixing a powder mixture of silicon nitride powders (with or without alumina powders), and fine silicon carbide powders, with a solution of a preceramic polymer containing silicon and nitrogen, to form a solution for impregnation, by passing carbon fibers through the solution to produce a mass of impregnated carbon fibers, forming the mass to a desired shape and by sintering in an inert atmosphere. Ultra-high strength and toughness are produced due to reinforcement by nanocompositization of the matrix phase, that by dispersion of fine particles and that by long carbon fibers, part of matrix phase is generated by thermal cracking of preceramic polymer.

17 Claims, No Drawings

CARBON FIBER REINFORCED SILICON NITRIDE BASED NANOCOMPOSITE MATERIAL AND METHOD FOR PREPARING SAME

FIELD OF THE INVENTION

This invention relates to a fiber-reinforced nanocomposite material which may be utilized as a heat-resistant structural material in need of high strength and high fracture toughness, such as cylinder liners for reciprocating engines, turbine rotor blades for gas turbine engine or braking materials, and a method for preparation thereof.

DEFINITIONS

In the present specification, the terms "nanocomposite material" and "nanocompositization" mean the material and the state in which crystal grains themselves are compositized by dispersion of nanometer level fine particles within the crystal grains, respectively.

DESCRIPTION OF RELATED ART

Ceramic materials are superior in mechanical properties, such as thermal resistance, resistance to high temperature reaction and wear resistance, and are used in a known manner in combustion subchambers for diesel engines or turbochargers as engine auxiliaries. There is also a prospect that these materials be used in the near future in gas turbine engines. However, the ceramic materials are brittle in nature, being lower in fracture toughness than aluminum alloys known as relatively brittle materials. While the values of fracture toughness of the ceramic materials differ markedly in a range of 2.6 to 9 MPam$^{178}$ from one type of the ceramic material to another, due to the difference in the sintered structure or the like, the problem of brittleness can not be overcome with monolithic (single matrix phase) materials.

For obviating the problem of brittleness inherent to the ceramic material, a variety of techniques for compositization, above all, methods of reinforcing the ceramic materials by dispersing various particles into a ceramic matrix or by dispersing various fibers into the ceramic matrix, are attracting attention. The fiber reinforced ceramic materials have been subject-matter of a number of patent applications, namely JP Patent KOKAI Publications Nos. 47-34510 (1972), 50-136306 (1975), 57-34080 (1982), 58-32071 (1983), 59-174575 (1984), 60-235765 (1985), 61-247663 (1986), 62-119174 (1987), 62-119175 (1987) and 62-35996 (1987). In this case, fibers such as short or long fibers and whiskers constitute the dispersed phase. The silicon nitride based composite materials, reinforced by both dispersed particles and long fibers, has also been proposed as exhibiting the maximum value of toughness, as disclosed in JP Patent KOKAI Publication 2-26876 (1990).

Recently, a nanocomposite material in which nanometer level (nm level) crystal grains or whiskers (or structural defects) are dispersed within the inside or at the crystal grain boundaries of the crystal grains, which have so far believed to be the smallest constituent fibers of the ceramics, for compositizing the crystal grains themselves, has been discovered, as disclosed in "New Ceramics" by Koichi Niihara, 2 (1989) 65-70. With such nanocomposite material, a number of favorable effects may be achieved, above all, the ceramic structure may be refined and improved in strength, while deflection of crack tips and the like occur through fine particles dispersed within the crystal grains for improving fracture toughness of the material etc. In the case of a silicon nitride/SiC based nanocomposite material, a value of toughness of KIC=6.7 MPam$^{\frac{1}{2}}$ has been reported in "Funtai oyobi Funmatsuyakinp38 (Powders and Powder Metallurgy), 37 (2), pages 352 to 356.

PROBLEM TO BE SOLVED AND OBJECT OF THE INVENTION

Although the above mentioned silicon nitride based composite material, reinforced with dispersed particles and with long fibers, exhibits a toughness of 25 MPam$^{\frac{1}{2}}$ or more, further improvement is desired further. On the other hand, as for the nanocomposite material, despite improvements attained up to now, a further improvement is similarly desired for its practical utilization.

It is a principal object of the present invention to improve these composite materials further and to provide ceramics of ultra toughness and ultra strength which can be used in gas turbine engines or rocket engines under extremely severe operating conditions, above all, at elevated temperatures, and a method for preparation thereof. Further objects will become apparent in the entire disclosure.

SUMMARY OF THE INVENTION

According to the present invention, carbon fibers are uniformly dispersed into a matrix phase, and at least a part of the matrix phase is generated by the reaction of an organometallic polymer (pre-ceramic polymer) and a ceramic powder starting material containing dispersed ultrafine ceramic particles of the nanometer level for drastically improving fracture toughness and strength of a fiber-reinforced ceramic composite material.

In one aspect, the present invention provides a carbon fiber reinforced silicon nitride based nano-composite material consisting essentially of at least one of a silicon nitride phase and a Si-Al-O-N phase as a matrix phase and carbon fibers as a dispersed phase, wherein fine SiC particles are dispersed in crystal grains and at the crystal grain boundaries of the matrix phase and wherein at least a part of the matrix phase is produced by thermally converting a preceramic polymer comprising main ingredients of silicon and nitride.

The following meritorious effects may be derived from the above described construction of the present invention. That is, the fine SiC particles, dispersed within the crystal grains of the matrix phase, play the role of nuclei for crystal grain growth to improve mechanical properties such as toughness or bending strength. On the other hand, the SiC particles, dispersed at the crystal grain boundaries of the matrix phase, control the structure of the crystal grain boundaries to realize the crystal grain boundaries which are strong up to elevated temperatures to contribute to improved strength, creep resistance and fatigue strength at elevated temperatures. As a result of SiC dispersion, sintering at a temperature (e.g., 1700° C.), which is higher by about 100° C. than the sintering temperature when SiC particles are not dispersed (e.g., 1600° C.), is enabled, because cracking of Si-Al-O-N at elevated temperatures is suppressed. Due to the increased sintering temperature, the bonding Strength between the fibers and the matrix may be improved to increase the KIC value. Above all, if the content of the dispersed nanoparticles is 30 vol% or higher, the crystal grains of the matrix become finer in size, so that ultra-plastic deformation capability may be afforded to the composite material, depending on the particular conditions employed. Another composite material, combined with heat-resistant materials in connection with improvement in strength and toughness, may also be realized. That is, three basic reinforcement systems, namely that due to dispersion of nano SiC, dispersion of SiC particles and addition of carbon fibers, may be achieved simultaneously by using the preceramic polymer, while synergistic effects, namely the effects that the sintering temperature may be raised and that the bonding strength between the fibers and the matrix may be improved, may also be achieved by dispersion of SiC, as a result of which higher values of toughness and strength, far in excess of those realized in the prior art, may now be achieved.

Meritorious effects of the invention are summarized as follows:

The problem of brittleness, which has been said to be a weak point of ceramics, has now been overcome by reinforcement with fibers, above all, with long filaments. Besides, fine SiC particles are dispersed within crystal grains (at a nanometer level) and at the crystal grain boundaries of the ceramics for nano-compositizing the crystal grains themselves and establishing a reinforcing mechanism of fine particles dispersion reinforcement. In addition, protection of carbon fibers may be achieved by the presence of the reaction product phase of thermal cracking of the pre polymer in the boundary region with the carbon fibers, while high temperature cracking of Si-Al-O-N may be prevented by dispersion of SiC to enable sintering at higher temperatures and drastic increase in physical properties, such as strength, toughness etc. These physical properties may be improved by 20% to 50% as compared to those of the conventional products. Meanwhile, since high temperature sintering is now possible, the bonding strength between the carbon fibers and the matrix has been drastically improved, as is also ascribable to the presence of the above mentioned reaction product phase of thermal cracking of the preceramic polymer.

The value of KIC of the vanguard ceramic material is targeted at KIC≧10 (MPam$^{\frac{1}{2}}$). The KIC value of the carbon fiber reinforced silicon nitride based nano-composite sintered product of the present invention significantly exceeds this target level, while comparing favorably to or even exceeding the hitherto achieved highest KIC value. That is, the KIC values of 18 to 23.5 MPam$^{\frac{1}{2}}$ are achieved in Example 1 (Table 1), whilst the KIC values in excess of 30 MPam$^{\frac{1}{2}}$ are achieved in Example 2 (Table 2).

The composite material of the present invention not only may be applied to reciprocating engines, gas turbine engines or to solid or liquid fuel propelled rocket engines, but has opened the way for application to a material used in aerospace industry or to a structural material in need of high fatigue proofness and durability which have been hitherto believed to be unfeasible with monolithic materials.

In this manner, by combined reinforcement of the reinforcement by the silicon nitride or Si-Al-O-N based nanocompositized matrix phase, the reinforcement by the long carbon fibers and the reinforcement by the dispersed silicon carbide particles, a carbon fiber reinforced silicon nitride based nanocomposite sintered material, which is producible industrially and has a high resistance against thermal impact and a high fracture toughness, may now he provided in accordance with the present invention.

The essential feature of the present invention resides in that reinforcement systems for ceramics, so far known and used separately or as a combination of two at most, may now be applied to a single material by an extremely simple process. That is, reinforcement or the matrix phase by nanocompositization and that by dispersion of fine particles may be achieved simultaneously by the dispersion of the fine particles of silicon carbide within the silicon carbide based or Si-Al-O-N based matrix phase and at the crystal grain boundaries of the matrix phase. In addition, thermal cracking of the preceramic polymer used as means therefor enables uniform dispersion of the long carbon fibers (filaments), forming (molding) and sintering at higher temperatures (with formation of the protective layer by the thermal cracking reaction products). Dispersion of SiC also contributes to the sintering at higher temperatures. It is truly surprising that these meritocious features may be realized comprehensively by an extremely single process.

It is an additional feature of the present invention that the entire matrix phase and occasionally the dispersed particles need not be generated directly from the preceramic polymer, but a part of the matrix phase may be derived from the preceramic polymer, whereby the fiber-reinforced nanocomposite material, exhibiting a sufficiently high level of reinforcement, may be produced.

DETAILED DESCRIPTION OF THE PREFERRED EMBODIMENTS

The nano-composite material of the present invention contains particles- dispersed within crystal grains and at the crystal grain boundaries .of the matrix phase, and contains particles about 500 nm or less in size dispersed at least within the crystal grains. From the standpoint of manufacture technology, the particles dispersed within the crystal grains may be about 10 nm or more and usually about 20 nm or more in size. However, this is not to be construed in the limiting sense. Meanwhile, the SiC particles dispersed at the crystal grain boundaries may be larger in size than those dispersed in the crystal grains, and may be of a particle size of 2500 nm or less. However, for fully demonstrating the nano-dispersion effects, the mean crystal grain size of SiC at the crystal grain boundaries is preferably 300 nm or less. Above all for displaying the effects proper to SiC particles, the particles of silicon carbide (SIC) dispersed in the crystal grains of the matrix phase are preferably of a mean crystal grain size of 200 nm or less.

Silicon carbide should be contained as a component in a proportion of 0.2 to 60 mol % based on the total composition. A content of silicon carbide less than 0.2 mol % is insufficient for silicon carbide to display the effect of its presence such as to play the role of nuclei for growth of the matrix phase crystals to improve mechanical properties such as toughness or to realize the strong crystal grain boundary up to elevated temperatures. On the other hand, a content of silicon carbide in excess of 60 mol % tends to present sintering difficulties. The amount of silicon carbide is preferably 0.8 to 40 mol%, more preferably 2 to 5 mol % based on the total composition.

The silicon nitride phase and/or the Si-Al-O-N phase, as the matrix phase, have been selected in view of high toughness and high strength at higher temperatures, with the mean crystal size thereof being generally 0.3 to 30 μm and preferably 0.5 to 5 μm. It is noted that at least a part, usually 1 to 90 vol%, preferably at least 5 vol.%, of these matrix phases is generated by thermally converting the pre-ceramic polymer comprising main ingredients of silicon and silicon nitride. This enables and facilitates uniform dispersion within the matrix of the ultrafine silicon carbide and the carbon fibers as the dispersed phase. It is preferred to use long carbon filaments as the carbon fibers. The fiber diameter may be optionally selected within the range of 0.3 to 150 μm. The proportion of silicon nitride and/or Si-Al-O-N is preferably 20 to 80 wt%, more preferably 40 to 65 wt%, based on the total weight of the material. The content of the carbon fibers, which may be suitably determined for reinforcing the composite material, is generally 1 to 90 vol%, preferably 10 to 70 vol% and more preferably 40 to 60 vol%, based on the total composition.

As the preceramic polymers, one or more of perhydropolysilazane, polysilazane and polyorganohydrosilazane is preferably employed. The perhydropolysilazane has a main repeating unit of $+\text{SiH}_2\text{NH}+_n$. The Polysilazane has a main repeating unit of

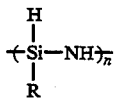

wherein R denotes at least a group having not more than 7 carbon atoms selected from alkyl group, alkenyl group, aryl group, cycloalkyl group, alkylsilyl group, alkylamino group or alkoxy group. The polyorganohydrosilazane has the formula $(\text{R}^1\text{SiHNH}) \times [(\text{R}^2\text{SiH})_{1.5}\text{N}_{1-x}]$, where $\text{R}^1$ and $\text{R}^2$ may be the same or different and denote a group having not more than 7 carbon atoms, selected from alkyl group, alkenyl group, aryl group, cycloalkyl group, alkylsilyl group, alkylamino group or alkoxy group, and where $0.4 < x < 1$. These preceramic polymers are described in detail in, for example, JP Patent KOKAI Publications Nos. 60-145903 (1985), 60-226890 (1985), 61-89230 (1986) and 62-156135 (1987). These disclosures are incorporated herein by reference.

It is noted that, in preparing the composite material of the present invention, perhydropolysilazane, an inorganic polysilazane, is more preferred than organic polysilazanes. If R is contained in the material, there is probability that carbon atoms may be left to a more or less extent after thermal cracking. Moreover, since such carbon is present in an amorphous state, it needs to be removed by decarbonization, which leads to formation of pores or the like hindrance against densification. Therefore, if an organic polysilazane is to be used, it is preferred that the number of carbon atoms be as small as possible, such as 1 or 2. For realization of uniform dispersion, the proportion of the phase generated by thermal cracking of the preceramic polymer in the total quantity of the matrix phase is preferably 5 vol% or higher and more preferably 10 Lo 15 vol%. However, if need be, the proportion may also be increased to 20 vol% or to 30 to 50 vol%. Meanwhile, the relative density of the composite material is preferably 70 or higher, while a composite material with a relative density of 90, 95 or 98% or higher may also be produced.

In another aspect, the present invention provides a method for preparing a carbon fiber reinforced silicon nitride based nano-composite material comprising the steps of mixing a powder mixture of silicon nitride powders or silicon nitride-alumina powders on the one hand and silicon carbide powders having a mean particle size of not more than 0.5 μm, on the other hand, with a solution comprising a preceramic polymer containing silicon and nitrogen as essential components, to provide a solution for impregnation, continuously passing carbon fibers through said solution for impregnation for uniformly impregnating said carbon fibers with said solution for impregnation to produce a mass of impregnated carbon fibers, forming said mass to a desired shape, optionally by cutting and stacking, to produce a shaped body, and sintering said shaped body in an inert atmosphere.

With the present method, the production process may be simplified as compared to the case in which the entire matrix phase is directly generated by thermal cracking from the preceramic polymer. In addition, the matrix phase structure with uniform quality in which fine SiC particles are evenly dispersed in the crystal grains and at the crystal grain boundaries of the matrix phase is efficiently produced. The matrix phase components containing the dispersed SiC particles may be obtained by mixing silicon carbide particles with silicon nitride powders or with a mixture of alumina and silicon powders. Otherwise, Si-C-N composite precursor powders, produced such as by CVD, may be used as at least a part of a mixture containing the silicon nitride powders.

If a powdered starting material is used as a starting material, it is preferred that the mean particle size of the powdered starting material of alumina and silicon nitride be not larger than 1.5 μm (preferably not more than 0.5 μm) and that of the powdered starting material of silicon carbide be not more than 0.5 μm (preferably not more than 0.4 μm). In this manner, a ceramic composite material with ultrahigh toughness and strength may be produced in which ultrafine (nano level) size silicon carbide is evenly dispersed in the crystal grains and at the crystal grain boundaries of the matrix phase. To this end, silicon carbide is contained preferably in an amount of 0.5 to 25 mol percent in the matrix components, that is the starting material which will make up the matrix phase. It is noted that, while alumina will generate a Si-Al-O-N phase, at least a part of the alumina reacts with silicon nitride generated by thermal cracking of the preceramic polymer. During the sintering, nano-compositization of the matrix phase is achieved, and at the same time the silicon carbide dispersed in the grain boundary of the matrix phase contributes to establish a mechanism of the particle dispersion reinforcement.

For evenly dispersing the fibers within the matrix, it is preferred to use a wet type filament winding method including passing the fibers through a solution for impregnation and taking up the liquid-impregnated fibers on a bobbin. A green material in the form of the impregnated fibers taken up by the filament winding method is shaped into a UD, 2D or 3D (one-, two- or three dimensional) structure. By subsequent heat treatment under a nitrogen gas or a mixed gas of argon or nitrogen with ammonia at 400° C. to 700° C. (preferably about 600° C.), an organo-metallic polymer (pre-ceramic polymer) becomes insoluble and nonfusible and is converted into an amorphous substance having a composition of a silicon nitride. This material is then sintered, preferably in an inert gas atmosphere such as argon or nitrogen, to a carbon fiber reinforced silicon nitride-based nanocomposite material.

The sintering is carried out preferably by press sintering, such as by hot press or HIP (hot isostatic press), and occasionally under a pressurized gas. The sintering temperature is 1200° to 2000° C. and preferably about 1600° to 1700° C. Although the pressure may be optionally selected in the case of using the hot press, a pressure of an order of 29 to 34 MPa (300 to 350 kg/cm$^2$G) suffices. The sintering temperature becomes the lower the higher a proportion of the preceramic polymer, such that, at. a proportion of the preceramic polymer of 20% or higher, the sintering may be carried out even at 1200° C. For the preceramic polymer proportion of an order of 5 to 15 vol%, an optimum sintering temperature is 1600° to 1700° C. The sintering conditions, such as sintering temperature and pressure, may be selected with a view to achieving a desired high density, respectively.

EXAMPLES

EXAMPLE 1

A solution for impregnation for preparing the matrix is first prepared. Thus, 64.6 g of polysilazane (NCP-200 manufactured by CHISSO K.K.; a product containing 65% of polysilazane in toluene) are dissolved in 87.4 g of solvent toluene. The so-produced solution is charged into a barimill type polyethylene pot with an inner capacity of 500 cc. 67.9 g of silicon nitride powders with a mean particle size less than 0.2 $\mu$m (E-10 manufactured by UBE KOSAN K.K.) and 38.6 g of alumina with a mean particle size less than 0.4 $\mu$m (AL-20 manufactured by ASAHI KASEI KOGYO K.K.), into which 10 mol % of SiC with a mean particle size less than 0.3 $\mu$m (Ibiden Ultra-Fine) are dispersed in advance, are then charged into the pot. Finally, 300 g of cylindrical high alumina media, 12.5 mm in diameter and 12.5 mm in height, are charged into the pot. A pot lid is then closed. As the alumina powders, into which the silicon nitride powders and SiC are dispersed in advance, those powders which were dried at 70 to 80 ° C. for 48 hours or longer and subsequently cooled should be used.

The pot content is mixed at 500 rpm for 16 hours and then taken out of the pot so as to be used as a solution for impregnation. The solution is poured into a vessel for impregnation and long carbon filaments of about 4.4 $\mu$m in diameter (PAN series HMS-55X manufactured by TOHO RAYON K.K.) are then fitted on a spool block. The fibers are then wound on a take-up mandrel, with a take-up speed set to 3 to 5 cm per second. For uniform fiber dispersion, the take-up tension is controlled so that the fibers are sacredly oriented by a roll during the impregnation process.

Hot air of 40° to 50° C. is supplied to fiber strands directly after the impregnation process and before winding the strands on a take-up spool for partially volatilizing the solvent. The strands are taken up in this manner on a mandrel while adhesive property of polysilazane is maintained. Since the strand material taken up on the material exhibits adhesive property, it is desirable that the mandrel surface be fluorine-treated or wrapped by a silicon-coated polyester film.

The shaped product, dismantled from the spool, is cut to a desired shape and press-formed (or molded) under pressure by a biaxial press, cold isostatic press (CIP) or a hot isostatic press (HIP). The pressed product is charged into an oven maintained at 50° C. and dried for 24 hours.

Polysilazane is heat-treated up to a temperature of 700° C. with a temperature gradient of 3.5° C./hour under a pressurized N$_2$ gas at about 49 × 10$^4$Pa (about 5 kg/cm$^2$G) to convert the polysilazane into a completely inorganic substance.

During the sintering, fine powders of boron nitride are applied to the surface of the heat-treated press-formed product for masking. The masked product was then charged into a hot press die formed of a carbon material, and was sintered in an argon gas stream at 1600 to 1700° C. with a temperature gradient of 600° C. per hour at a pressure of 34.3MPa (350 kg/cm$^2$) to a carbon fiber reinforced Si-Al-O-N nano-composite material.

In this case, the matrix phase is Si-Al-O-N phase (X Si-Al-O-N and X' Si-Al-O-N), and SiC is present within crystal grains and at the crystal grain boundaries of the matrix phase, as demonstrated by TEM and X-ray diffraction analyses. A reaction product phase, derived from thermal cracking of the preceramic polymer, is present in the boundary region around the carbon fibers. The mean crystal grain size of the matrix phase (Si-Al-O-N) was 1 to 2 $\mu$m, whereas that of the SiC crystal grains, dispersed in the crystal grains of the matrix phase, was about 90 nm. The mean crystal grain size of the SiC crystal grains, present at the crystal grain boundaries of the matrix phase, was about 300 nm.

The carbon fibers are present at a proportion of 50 vol% based on the total volume of the material. Measurement with an Archimedes method indicated that the coefficient of water absorption was 0.67%, the bulk density was 2.57 and the apparent porosity was 1.72%.

Test pieces (3×4×40 mm) according to JIS bending test, cut from this nano-composite material along the longitudinal fiber axis, were finished by diamond cutting and grinding for measuring final mechanical properties. Also, a V notch, 1.5 mm in depth and about 1.8 $\mu$m in radius of curvature, were formed on the same test pieces and fracture toughness thereof was measured in accordance with a single edge V notched beam method (SEVNB method). The results are shown in Table 1. Similar tests were conducted on test pieces of a carbon fiber reinforced Si-Al-O-N composite material, that is a conventional material in which alumina not dispersed with silicon carbide is used in place of alumina dispersed with silicon carbide, by way of a Comparative Example 1.

Meanwhile, the proportion of the matrix phase portion derived from the preceramic polymer to the entire matrix phase is estimated to be in a range of from 5 to 10 vol%.

TABLE 1

| Physical Properties of Sintered Products | | | |
|---|---|---|---|
| Sintered at 1600° C. | | Sintered at 1700° C. | |
| Bending strength kg/mm$^2$ (MPa) | K$_{IC}$ MPa m$^{\frac{1}{2}}$ | Bending strength kg/mm$^2$ (MPa) | K$_{IC}$ MPa m$^{\frac{1}{2}}$ |
| Ex. 1 | 63.5 (623) | 18.3 | 70.5 (692) | 23.5 |
| Comp. Ex. 1 | 50.1 (491) | 15.2 | 45.0 (441) | 13.0 |

EXAMPLE 2

A solution for impregnation for preparing the matrix is first prepared. Thus, 64.6 g of polysilazane (NCP-200 manufactured by CHISSO K.K. as a 65%-solution in toluene; are dissolved in 87.4 g of solvent toluene. The so-produced solution is charged into a ball-mill type polyethylene pot with an inner capacity of 500 cc. Then, 98 g of Si-C-N composite precursor powders with particle size of 0.3 μm or less, comprising 70 wt% of $Si_3N_4$ and 30 wt% of SiC. (MSM 33 manufactured by CVD method by MITSUBISHI GAS KAGAKU K.K.), are charged into the pot, followed by charging 6.4 g of yttria powders with a mean particle size of 0.4 μm (manufactured by NIPPON YTTRIUM K.K.), and 2.1 g of alumina powders with a mean particle size of 0.15 μm (TM-10 manufactured by DAIMEI KAGAKU K.K.).

Finally, cylindrical high alumina media, 12.5 mm diameter and 12.5 mm in height, are charged into the pot, and a pot lid is closed. The charged powders are those dried at 70° to 80° C. for 48 hours or longer and cooled before mixing.

The carbon fiber reinforced silicon nitride based nano-composite material was prepared in the same manner as in Example 1, and properties thereof were checked.

It has found that the matrix phase was $Si_3N_4$ (β) and that SiC was present in the crystal grains and at the crystal grain boundaries of $Si_3N_4$.

The $Si_3N_4$ matrix phase had a mean crystal grain size of 1 to 2 μm and the SiC crystal grains, present in the crystal grains and at the crystal grain boundaries of the matrix phase, had mean crystal grain sizes of 100 nm and 200 nm, respectively. It is noted that the reaction product phase derived from thermal cracking of the preceramic polymer was present around the carbon fibers.

The carbon fibers are present at a ratio of 50 vol%. Measurement with an Archimedes method indicated the coefficient of water absorption of 0.65%, bulk density of 2.47 and apparent porosity of 1.61%.

The measured values of bending strength and fracture toughness are shown in Table 2.

Similar tests were conducted on carbon fiber reinforced silicon nitride based composite material prepared by a conventional method. The results of measurement are shown in Table 2.

The composite material, employed in Comparative Example 2, was prepared in the following manner.

A solution for impregnation, used for preparing the matrix, is first prepared. Thus, 64.6 g of polysilazane (NCP-200 manufactured by CHISSO K.K. as a 65%-solution in toluene) are dissolved in 87.4 g of solvent toluene. The resulting solution is charged into a ball-mill type polyethylene pot with an inner capacity of 500 cc, followed by 98 g of silicon nitride powders with a mean particle size less than 0.2 μm (COA manufactured by UBE KOSAN K.K. as a mixture of 90 wt% of silicon nitride E-10, 5 wt% of $Al_2O_3$ and 5 wt% of $Y_2O_3$ as sintering aids).

Finally, 300 g of cylindrical high alumina media, 12.5 mm in diameter by 12.5 mm in height, are charged into the pot, and a pot lid is closed. Silicon nitride powders used are those dried at 70° to 80° C. for 48 hours or longer and cooled before mixing. Sintered products are then produced in the same manner as in Example 1.

TABLE 2

| | Physical Properties of Sintered Products | | | |
|---|---|---|---|---|
| | Sintered at 1600° C. | | Sintered at 1700° C. | |
| | Bending strength $kg/mm^2$ (MPa) | $K_{IC}$ MPa $m^{\frac{1}{2}}$ | Bending strength $kg/mm^2$ (MPa) | $K_{IC}$ MPa $m^{\frac{1}{2}}$ |
| Ex. 2 | 72.0 (706) | 30.2 | 77.0 (755) | 32.0 |
| Comp. Ex. 2 | 69.0 (677) | 28.1 | 60.0 (589) | 23.0 |

EXAMPLE 3

SiC powders the same as used in Example 1 were dispersed in an amount of 10, 20, 30 and 40 mol%, respectively, in alumina powder. Otherwise in the same manner as in Example 1, samples were prepared.

The results are shown in Table 3.

TABLE 3

| SiC dispersed in alumina | 10 mol % | 20 mol % | 30 mol % | 40 mol % |
|---|---|---|---|---|
| Bending Strength $kg/mm^2$ (M Pa) | 70.5 (691) | 64.0 (627) | 58.0 (568) | 47.5 (466) |
| Fracture toughness KIC M Pa $m^{\frac{1}{2}}$ | 23.5 | 28.3 | 20.0 | 15.1 |

EXAMPLE 4

The samples were prepared substantially in the same manner as in Example 1 provided that the sintering was done at different temperatures of 1600, 1650, 1700 and 1750° C. by HP pressing at about 32 H Pa (330 kg/$cm^2$).

The results are shown in Table 4.

TABLE 4

| Sintering temperature (°C.) | Bending strength $kg/mm^2$ (M Pa) | Fracture toughness KIC (M Pa $m^{\frac{1}{2}}$) |
|---|---|---|
| 1600 | 63.5 (622) | 12.3 |
| 1650 | 63.2 (619) | 20.6 |
| 1700 | 70.5 (691) | 23.5 |
| 1750 | 55.3 (542) | 20.2 |

The following conditions are preferred to achieve a fracture toughness KIC of at least 30 M Pa $m^{\frac{1}{2}}$:—

The conditions for the preparing steps for mixing, impregnating, forming, drying and resin-removal may be substantially as set forth in Example 1, The sintering is made at 1700° C. by HP-pressing about at 32 M Pa (330 kg/$cm^2$) in an Ar atomsphere. X— and X' Si-Al-O-N's are preferred as a matrix phase which should have an average crystal grain size of 1 to 2 μm. SiC grains dispersed within each of the matrix grains should have an average grain size of about 90 nm; while SiC grains dispersed in the boundary phase between the matrix grains have an average grain size of about 300 nm.

In summary, the nanocomposite material is characterized by the presence of nano-level grains which are dispersed within the crystal grain itself of the matrix, the matrix grain having been long deemed to be the minimum constituent unit of the ceramic material. Namely, the crystal grain itself of the matrix phase constitutes a composite grain. The presence of such composite grains contributes to the refining of the microstructure of ceramics, prohibition of abnormal grain growth, control of grain shape, deflection of the crack tips by the in-grain dispersed nanoparticles, formation of microcracks within the crystal grain (transgranular microcracks) and the like meritorious phenomena.

It should be noted that modifications obvious in the art can be made without departing from the gist of the present invention as disclosed herein and as claimed in the appended claims.

What is claimed is:

1. A carbon fiber reinforced silicon nitride based nanocomposite material comprising:
   a nanocomposite material consisting essentially of at least one of a silicon nitride phase and a Si-Al-O-N phase as a matrix phase and carbon fibers as a dispersed phase,
   ultrafine, nanometer level particles of silicon carbide dispersed within crystal grains and at crystal grain boundaries of the matrix phase, the silicon carbide being present in an amount of 0.2 to 60 mole of the matrix phase,
   wherein at least a portion of the matrix phase is produced by thermally converting a preceramic polymer comprising mainly silicon and nitrogen.

2. The carbon fiber reinforced silicon nitride based nanocomposite material as defined in claim 1 wherein at least 5 vol% of the matrix phase has been derived from said preceramic polymer.

3. The carbon fiber reinforced silicon nitride based nanocomposite material as defined in claim 1 wherein the ultrafine particles of silicon carbide with a mean crystal grain size of 500 nm or less are dispersed within the crystal grains of the matrix phase.

4. The carbon fiber reinforced silicon nitride based nanocomposite material as defined in claim 3 wherein the ultrafine particles of silicon carbide dispersed at the crystal grain boundaries of the matrix phase have a mean crystal grain size of 2500 nm or less.

5. The carbon fiber reinforced silicon nitride based nanocomposite material as defined in claim 1 wherein the matrix phase has a mean crystal grain size of 0.3 to 30 μm.

6. The carbon fiber reinforced silicon nitride based nanocomposite material as defined in claim 1 comprising 20 to 80 wt% of at least one of silicon nitride and Si-Al-O-N based on the total weight of the material.

7. The carbon fiber reinforced silicon nitride based nanocomposite material as defined in claim 1 wherein the carbon fibers are filaments.

8. The carbon fiber reinforced silicon nitride based nanocomposite material as defined in claim 1 wherein said preceramic polymer is at least one selected from the group consisting of perhydropolysilazane, polysilazane and polyorganohydrosilazane,
   said perhydropolysilazane having a main repeating unit represented by the formula $-(SiH_2NH)_n-$,
   said polysilazane having a main repeating unit represented by the formula

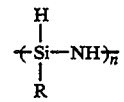

wherein R stands for a group having 7 or less carbon atoms selected from the class consisting of alkyl group, alkenyl group, aryl group, cycloalkyl group, alkylsilyl group, alkylamino group and alkoxy group, and
   said polyorganohydrosilazane having the formula $(R^1SiHNH) \times [(R^2SiH)_{1.5}N_{1-x}]$, where $R^1$ and $R^2$ may be the same or different and represent a group having 7 or less carbon atoms selected from the class consisting of alkyl group, alkenyl group, aryl group, cycloalkyl group, alkylsilyl group alkylamino group and alkoxy group, and where $0.4 < x < 1$.

9. The nanocomposite material as defined in claim 1 or 2 wherein the ultrafine particles of silicon carbide dispersed within the crystal grains of the matrix phase have a mean crystal grain size of about 10 nm to 200 nm.

10. The nanocomposite material as defined in claim 9 wherein the ultrafine particles of silicon carbide dispersed at the crystal grain boundaries of the matrix phase have a mean crystal grain size of about 300 nm or less.

11. The nanocomposite material as defined in claim 1 wherein the silicon carbide is present in an amount of 0.5 to 25 tool % of the matrix phase.

12. The nanocomposite material as defined in claim 10 wherein said at least one of silicon nitride and Si-Al-O-N is present in an amount of 40 to 65 wt% of the entire material.

13. The nanocomposite material as defined in claim 1 wherein the carbon fibers are present in an amount of 10 to 70 vol% of the entire material.

14. The nanocomposite material as defined in claim 1, which has a fracture toughness $K_{rc}$ of at least 18 MPam$^{\frac{1}{2}}$.

15. The nanocomposite material as defined in claim 1, which has a fracture toughness $K_{rc}$ of at least 23.5 MPam$^{\frac{1}{2}}$.

16. The nanocomposite material as defined in claim 1, which has a fracture toughness $K_{rc}$ of at least 30 MPam$^{\frac{1}{2}}$.

17. The nanocomposite material as defined in claim 1, which has a fracture toughness $K_{zc}$ of at least 32 MPam$^{\frac{1}{2}}$.

* * * * *